US011494143B2

(12) United States Patent
Matsuura

(10) Patent No.: US 11,494,143 B2
(45) Date of Patent: Nov. 8, 2022

(54) IMAGE FORMING DEVICE, CONSENT CONFIRMATION METHOD, AND PROGRAM

(71) Applicant: KONICA MINOLTA, INC., Tokyo (JP)

(72) Inventor: Tsumoru Matsuura, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/222,268

(22) Filed: Apr. 5, 2021

(65) Prior Publication Data
US 2021/0334053 A1 Oct. 28, 2021

(30) Foreign Application Priority Data

Apr. 28, 2020 (JP) .............................. JP2020-078998

(51) Int. Cl.
G06F 3/12 (2006.01)
(52) U.S. Cl.
CPC .......... G06F 3/1256 (2013.01); G06F 3/1238 (2013.01); G06F 3/1259 (2013.01); G06F 3/1273 (2013.01)
(58) Field of Classification Search
None
See application file for complete search history.

(56) References Cited

U.S. PATENT DOCUMENTS 9,047,639 B1 * 6/2015 Quintiliani ........... G06Q 40/025
9,274,731 B2 * 3/2016 Young ................... G06F 3/1273
2001/0037267 A1 * 11/2001 Sato .................... G06Q 10/0875
705/29
2007/0097423 A1 * 5/2007 Kawano ................ G06F 3/1204
358/1.15
2007/0147870 A1 * 6/2007 Shindo ............... G03G 15/5012
399/82
2009/0213416 A1 * 8/2009 Ishigure ................ G06F 9/4411
358/1.15
2011/0317210 A1 * 12/2011 Toyama ................ G06F 3/1285
358/1.15
2013/0321839 A1 * 12/2013 Sekiguchi ............. G06F 3/1225
358/1.13

(Continued)

FOREIGN PATENT DOCUMENTS

JP 2016055567 A 4/2016
JP 2017202627 A 11/2017

Primary Examiner — Henok Shiferaw
(74) Attorney, Agent, or Firm — Buchanan Ingersoll & Rooney PC

(57) ABSTRACT

An image forming device that collects usage data regarding the usage status of a user and sends the usage data to a server, the image forming device includes: a first hardware processor that receives a print job; a printer that performs printing based on the print job; a second hardware processor that determines whether or not a user who sent the print job is a target user of consent confirmation processing regarding collection of the usage data; a display that displays various display screens; and a third hardware processor that pauses printing based on the print job and performs the consent confirmation processing to cause the display to display a consent confirmation screen, when the second hardware processor determines that the user is a target user of the consent confirmation processing.

18 Claims, 17 Drawing Sheets

(56) References Cited

U.S. PATENT DOCUMENTS

2016/0295034 A1* 10/2016 Miyazawa ......... H04N 1/00411
2016/0364192 A1* 12/2016 Fujii .................. H04N 1/00244
2018/0247385 A1* 8/2018 Whitfield .............. H04L 63/102

* cited by examiner

FIG. 4

| No. | USER NAME | AUTHENTICATION INFORMATION | PRINTER DRIVER | PANEL OPERATION DATE | CONSENT CONFIRMATION PROCESSING | CONFIRMATION RESULT |
|---|---|---|---|---|---|---|
| 1 | USER A | ******** | AirPrint | 2020/JAN/24 | YES | UNCONFIRMED |
| 2 | USER B | ******** | AirPrint | 2020/APR/3 | YES | UNCONFIRMED |
| 3 | USER C | ******** | ORIGINAL | 2020/APR/27 | NO | DISSENT |
| 4 | USER D | ******** | ORIGINAL | 2020/APR/27 | NO | CONSENT |

USER D

| No. | DEVICE IDENTIFICATION INFORMATION | INSTALLATION LOCATION | DATE AND TIME OF USE | JOB TYPE | JOB SETTINGS |
|---|---|---|---|---|---|
| 1 | MFP001 | RoomA (1F) | 2020/APR/27 16:21 | COPY | DUPLEX, 2in1, STAPLE, ... |
| 2 | MFP001 | RoomA (1F) | 2020/APR/27 15:54 | COPY | SIMPLEX, 1in1, STAPLE, ... |
| 3 | MFP001 | RoomA (1F) | 2020/APR/27 14:01 | PRINT | SIMPLEX, COLOR, 2in1, ... |
| 4 | MFP001 | RoomA (1F) | 2020/APR/27 10:28 | PRINT | SIMPLEX, MONOCHROME, 2in1, ... |
| ... | ... | ... | ... | ... | ... |

Mr./Ms. USER A

TO IMPROVE YOUR CONVENIENCE, INFORMATION REGARDING YOUR USAGE WILL BE COLLECTED FROM NOW ON.
MAY WE HAVE YOUR CONSENT?

B1 — YES    B2 — NO

Mr./Ms. USER A

OF YOUR USE HISTORY, THE FOLLOWING INFORMATION WILL ALSO BE COLLECTED FROM NOW ON.
• PRINT TIME
• PRINT AMOUNT
MAY WE HAVE YOUR CONSENT?

B1 — YES    B2 — NO

Mr./Ms. USER A

INFORMATION REGARDING YOUR PRINT TIME AND PRINT AMOUNT WILL BE USED FOR THE FOLLOWING PURPOSE FROM NOW ON.
• RECOMMENDATION OF OPTIMAL MFP
MAY WE HAVE YOUR CONSENT?

B1 — YES    B2 — NO

Mr./Ms. USER A

THE SAME PRINT JOB HAS BEEN RECEIVED.
DO YOU WANT TO PRINT THE SAME PRINT JOB?

B1 — YES   B2 — NO

Mr./Ms. USER A

THE SAME PRINT JOB HAS BEEN RECEIVED BY ANOTHER MFP AND PRINTING IS PAUSED.
DO YOU WANT TO PRINT FROM THE PAGE FOLLOWING THE PRINTING BY THE OTHER MFP?

B1 — YES   B2 — NO

IMAGE FORMING DEVICE, CONSENT CONFIRMATION METHOD, AND PROGRAM

The entire disclosure of Japanese patent Application No. 2020-078998, filed on Apr. 28, 2020, is incorporated herein by reference in its entirety.

BACKGROUND

Technological Field

The present invention relates to an image forming device, a consent confirmation method, and a program, and particularly to a technology for obtaining the consent of a user for collection of usage data regarding the usage status of the user.

Description of the Related Art

Conventionally, an image forming device such as a multifunction peripheral (MFP) has been known in which, when an image defect of an output image is detected, image forming processing by an image forming unit is stopped, a defective page in which the image defect is detected and the subsequent pages are ejected to a first output tray, and then a defect detection report is ejected to a second output tray (e.g., JP 2017-202627 A).

Additionally, there has also been known an image forming device (e.g., JP 2016-55567 A) in which, in a case where image forming processing for multiple sheets is performed continuously, the image forming processing is paused when a sheet ejection mode such as the orientation of a sheet on which an image is formed changes, and the user is given notification of that effect by a display on an operation panel.

Incidentally, the image forming device as described above has a function of collecting usage data regarding the usage status of the user and sending the usage data to a server operated by a manufacturer. By utilizing the usage data of the image forming device installed at the customer's site, the manufacturer can use it for later improvement of the device such as construction of an operation screen that is easy for the user to use, or can provide the optimum service according to the usage status of each customer. Conventionally, it has been common to obtain comprehensive consent from the representative (administrator) of the customer regarding collection and utilization of usage data.

However, in recent years, Japan and the European Union have placed strict restrictions on the collection and use of personal information. In the future, it is expected that the restrictions will become even stricter, and there may be cases where consent must be obtained for each individual user when utilizing usage data. For example, if the data items to be collected are changed, or if the purpose of using the usage data is changed, it may be necessary to obtain the consent of each individual user each time.

For example, when a user uses a copy function or a scan function of an image forming device, it is necessary to operate an operation panel of the image forming device in order to set a job. Hence, when the user performs an operation on the operation panel, it is possible to display a consent confirmation screen on the operation panel and obtain the user's consent for collecting usage data.

However, when the user uses a print function of the image forming device, he/she operates an information processing device such as a personal computer (PC) located away from the image forming device to send a print job to the image forming device and make the image forming device perform printing. That is, the user can acquire desired printed matter without looking at the display screen of the operation panel. This leads to a problem that there is no opportunity to obtain consent for collecting usage data from a user who uses only the print function of the image forming device, and usage data cannot be used effectively.

In order to solve the above problem, it is conceivable to add a function of displaying a consent confirmation screen to a printer driver activated in the information processing device used by the user, for example. However, in recent years, there have been an increasing number of cases where general-purpose printer drivers that are not original to the manufacturer, such as AirPrint, Mopria, and GooglePrint, are installed, and it is often not possible to display the consent confirmation screen.

SUMMARY

In view of the foregoing, the present invention has been made to solve the above problems, and an object thereof is to provide an image forming device, a consent confirmation method, and a program that enable even a user who uses the print function to appropriately perform consent confirmation processing.

To achieve the abovementioned object, according to an aspect of the present invention, an image forming device that collects usage data regarding the usage status of a user and sends the usage data to a server, reflecting one aspect of the present invention comprises: a first hardware processor that receives a print job; a printer that performs printing based on the print job; a second hardware processor that determines whether or not a user who sent the print job is a target user of consent confirmation processing regarding collection of the usage data; a display that displays various display screens; and a third hardware processor that pauses printing based on the print job and performs the consent confirmation processing to cause the display to display a consent confirmation screen, when the second hardware processor determines that the user is a target user of the consent confirmation processing.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 4 is a diagram showing an example of user information;

FIG. 5 is a diagram showing an example of usage data;

FIGS. 7A to 7C are diagrams exemplifying a consent confirmation screen;

FIG. 14 is a diagram showing an example of a print confirmation screen;

FIG. 17 is a diagram showing an example of a notification screen.

DETAILED DESCRIPTION OF EMBODIMENTS

Figure 1:
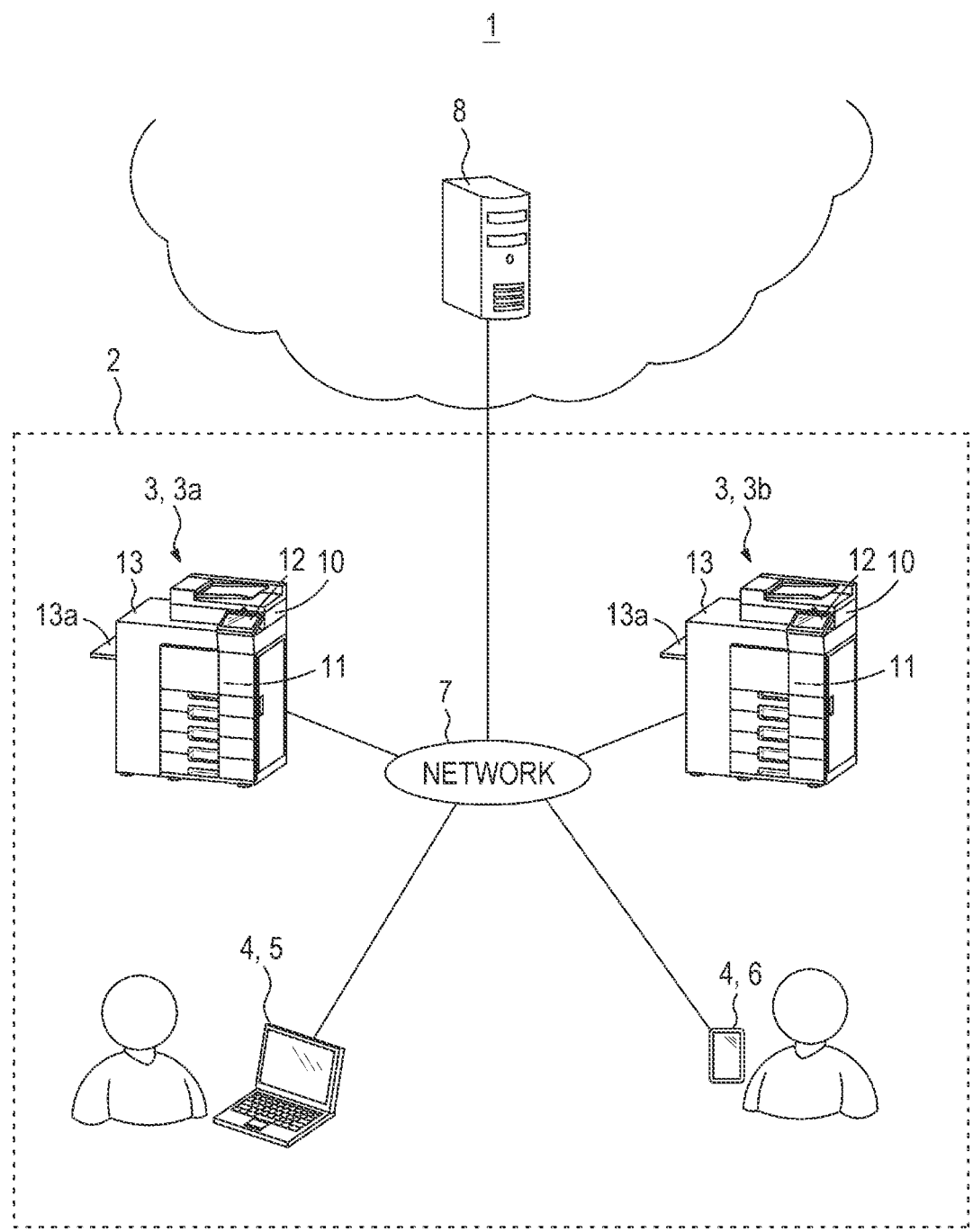
FIG. 1 is a diagram showing a schematic configuration of an image forming system.

Hereinafter, one or more embodiments of the present invention will be described with reference to the drawings. However, the scope of the invention is not limited to the disclosed embodiments. In the embodiments described below, common elements are designated by the same reference numerals, and duplicate description thereof will be omitted.

First Embodiment

FIG. 1 is a diagram showing a schematic configuration of an image forming system 1 of a first embodiment of the present invention. The image forming system 1 includes multiple image forming devices 3 provided in a customer's local environment 2 and a server 8 provided on a cloud such as the Internet, and is a system in which the image forming device 3 and the server 8 can communicate with each other.

In the local environment 2, the multiple image forming devices 3 are connected to a network 7 such as a local area network (LAN). The network 7 is connected to the server 8 on the cloud through the Internet or the like. Additionally, the local environment 2 is provided with multiple information processing devices 4 used by each of multiple users. The multiple information processing devices 4 can send a print job to the image forming device 3 through the network 7.

FIG. 1 exemplifies a case where two image forming devices 3a, 3b are connected to the network 7. In the following, when it is not necessary to distinguish between the two image forming devices 3a, 3b, the two image forming devices 3a, 3b are collectively referred to as the image forming device 3. Note that the number of image forming devices 3 connected to the network 7 is not limited to two, and may be one, or may be three or more.

The image forming device 3 is formed by an MFP, for example, and has multiple functions such as a copy function, a scan function, and a print function. The image forming device 3 operates a function selected by the user from among the multiple functions, and executes a job specified by the user.

The image forming device 3 includes a scanner part 10 and a printer part 11. The scanner part 10 optically reads a document set by the user to generate image data. For example, the scanner part 10 operates when the user instructs execution of a copy job or a scan job, and generates image data. The printer part 11 forms an image using toner on a sheet such as printing paper, and performs printing. For example, the printer part 11 operates when the user instructs execution of a copy job, and performs printing based on image data generated by the scanner part 10. Additionally, the printer part 11 operates when a print job is received through the network 7, and performs printing based on the received print job.

Additionally, the image forming device 3 includes an operation panel 12 serving as a user interface on the front side of the device main body. The operation panel 12 displays various information to the user and accepts operations by the user.

Moreover, the image forming device 3 includes a post-processing unit 13. The post-processing unit 13 is a device that performs post-processing such as stapling and punching on sheets output from the printer part 11. For example, when stapling or punching is specified in a print job, the image forming device 3 can operate the post-processing unit 13 to place staples or form punch holes at predetermined positions on the sheet. Then, the image forming device 3 ejects the sheet onto an output tray 13a provided in the post-processing unit 13. When stapling or punching is not specified in a print job, the image forming device 3 passes the sheet through the post-processing unit 13 with no stapling or punching performed thereon, and the sheet is ejected onto the output tray 13a.

The information processing device 4 is formed by a personal computer (PC) 5 or a mobile terminal 6, for example. The mobile terminal 6 is a device that a user can carry, such as a smartphone or a tablet terminal. The information processing device 4 is connected to the network 7 by wire or wirelessly. A printer driver for sending a print job to the image forming device 3 is installed in these information processing devices 4. The printer driver may be an original printer driver provided by the manufacturer of the image forming device 3, or may be a general-purpose printer driver provided by a third-party vendor.

The server 8 is a server installed and operated by the manufacturer of the image forming device 3. This server 8 is installed on the cloud and is connected to many image forming devices 3 installed at many customer's sites. Then, the server 8 collects usage data regarding the usage status of the user from each image forming device 3 installed at the customer's site. The usage data collected by the server 8 is utilized by the manufacturer of the image forming device 3. For example, by utilizing the usage data of each image forming device 3 installed at the customer's site, the manufacturer can use it for later improvement of the device such as construction of an operation screen that is easy for the user to use. Additionally, by utilizing usage data, the manufacturer can provide the optimal service according to the usage status of each customer.

For example, the image forming device 3 collects and accumulates usage data including job settings every time a job specified by the user is executed. Then, the image forming device 3 sends the accumulated usage data to the server 8 at a predetermined timing such as once a week. Note, however, that the data items that the image forming device 3 should collect as usage data may be changed by the server 8. Additionally, the purpose of use of the usage data collected from each image forming device 3 may also be changed by the server 8. In such a case, the server 8 notifies each image forming device 3 that the data item or the purpose of use has been changed. When each image forming device 3 receives a change notification from the server 8 indicating that the data item or the purpose of use has been changed, each image forming device 3 performs consent confirmation processing for obtaining consent from individual users regarding the collection of usage data. If the consent of the user can be obtained in the consent confirmation processing, the image forming device 3 then starts an operation of collecting usage data every time a job specified by the user is executed. On the other hand, if the user does not consent to the collection of usage data in the consent confirmation processing, the image forming device 3 does not collect data related to the user.

Figure 2:
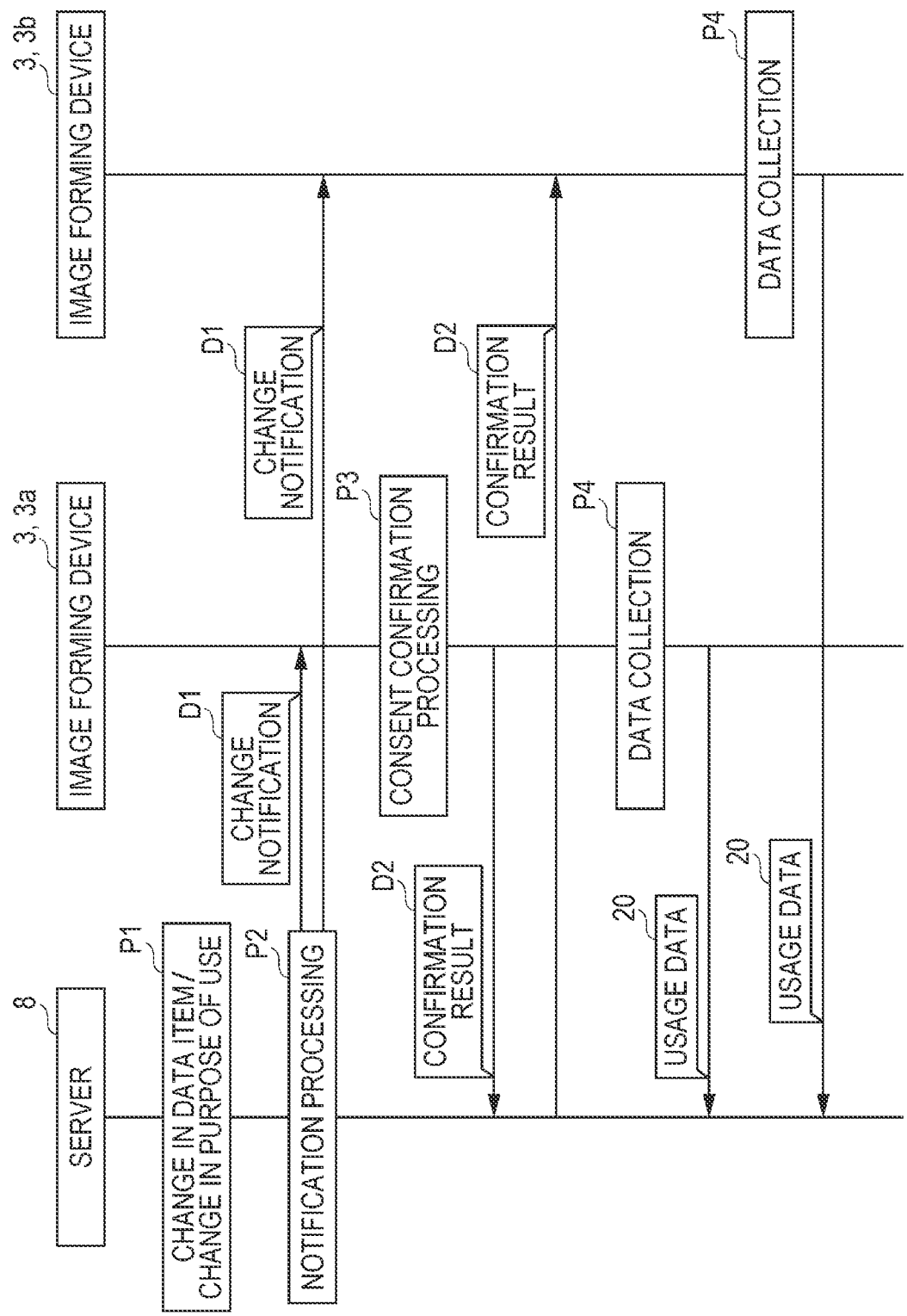
FIG. 2 is a diagram showing a basic process for collecting usage data in the image forming system.

FIG. 2 is a diagram showing a basic process for collecting usage data in the image forming system 1. First, when the data items collected as usage data are changed or the purpose of use of the usage data is changed by the server 8 (process P1), the server 8 performs notification processing for each image forming device 3 (process P2). By this notification processing, a change notification D1 is sent from the server 8 to each image forming device 3. For example, the image forming device 3 accesses the server 8 once a day, and the server 8 sends the change notification D1 when the access from the image forming device 3 is detected.

Upon receipt of the change notification D1 from the server 8, the image forming device 3 performs consent confirmation processing for obtaining the consent of each user regarding collection of usage data. This consent confirmation processing is performed for each user who uses the image forming device 3. For example, when a user sends a print job to the image forming device 3a, the image forming device 3a performs the consent confirmation processing (process P3). In the consent confirmation processing, each user's consent operation or dissent operation regarding collection of usage data is accepted, and the user's intention is confirmed. When the user's consent operation or dissent operation is accepted in the consent confirmation processing, the image forming device 3a sends a confirmation result D2 to the server 8. This confirmation result D2 includes information for identifying the user and information indicating whether or not the user has consented to collection of usage data.

Upon receipt of the confirmation result D2 from the image forming device 3a, the server 8 sends the confirmation result D2 to another image forming device 3b. In this case, the server 8 also sends the confirmation result D2 when access from the image forming device 3b is detected, for example. By receiving the confirmation result D2 from the server 8, the image forming device 3b can identify the user who has performed the consent operation or the dissent operation, and can know that there is no need that the image forming device 3b performs the consent confirmation processing for this user.

Thereafter, the image forming devices 3a, 3b collect data (process P4) every time the user who has consented to collection of usage data uses the image forming devices 3a, 3b. The image forming devices 3a, 3b accumulate collected usage data 20 and send the usage data 20 to the server 8 at a predetermined timing. Note that the timing at which the image forming devices 3a, 3b send the usage data 20 to the server 8 is arbitrary. For example, the image forming devices 3a, 3b may each send the usage data 20 to the server 8 during the nighttime when use by the user is less frequent.

Figure 3:
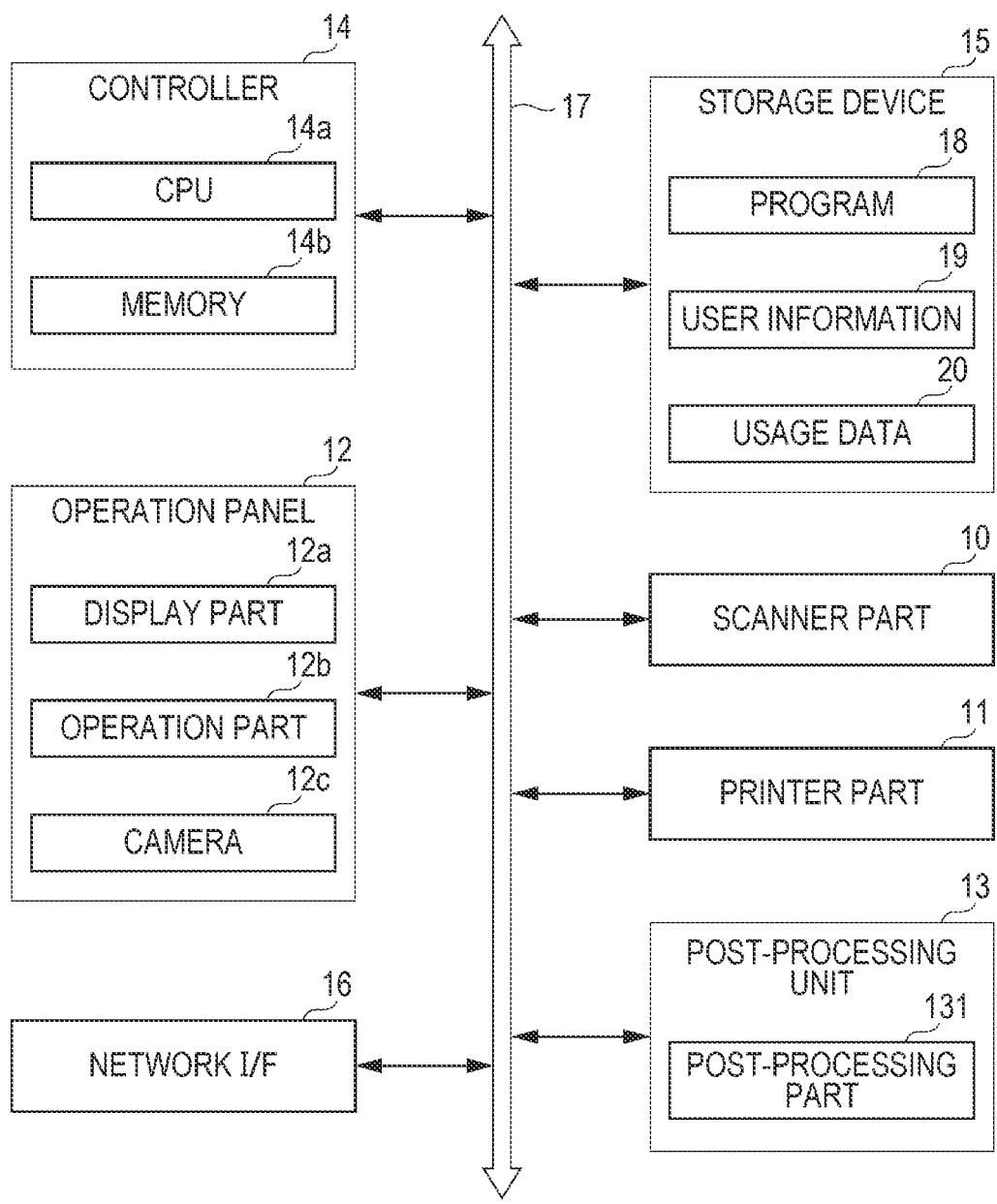
FIG. 3 is a block diagram showing an example of a hardware configuration of the image forming device.

FIG. 3 is a block diagram showing an example of a hardware configuration of the image forming device 3 as described above. The image forming device 3 includes, as its hardware configuration, the scanner part 10, the printer part 11, the operation panel 12, the post-processing unit 13, a controller 14, a storage device 15, and a network interface 16. These parts can input and output data to and from each other through a bus 17.

The operation panel 12 includes a display part 12a, an operation part 12b, and a camera 12c. The display part 12a is formed by, for example, a color liquid crystal display or the like, and displays various display screens on which the user can perform operation. The operation part 12b is formed by, for example, touch panel keys and the like, and accepts operations by the user. The camera 12c is a camera that captures an image of the surroundings of the image forming device 3. For example, the camera 12c captures a face image of a user who is attempting to operate the operation panel 12 in order to perform face recognition of the user.

The post-processing unit 13 includes a post-processing part 131. The post-processing part 131 is a processor for placing staples or forming punch holes in a sheet on which an image is formed ejected from the printer part 11.

The controller 14 includes a CPU 14a and a memory 14b, and controls the operation of each part. The CPU 14a is a hardware processor that reads and executes a program 18 stored in the storage device 15. The memory 14b is for storing temporary data and the like generated when the CPU 14a executes the program 18.

The storage device 15 is a non-volatile storage unit formed by a hard disk drive (HDD), a solid state drive (SSD), or the like. For example, the storage device 15 stores the program 18, user information 19, and the usage data 20. Other than this, various data and information can be stored in the storage device 15. For example, when printing based on a print job is paused, the storage device 15 can store the paused print job. Additionally, when printing based on a print job is suspended, the storage device 15 can store such a print job, too.

The network interface 16 is an interface for connecting the image forming device 3 to the network 7 for communication. The image forming device 3 receives a print job sent from the information processing device 4 through the network interface 16. Additionally, the image forming device 3 can communicate with the server 8 through the network interface 16.

FIG. 4 is a diagram showing an example of the user information 19. The user information 19 is information in which information regarding a user who uses the image forming device 3 is registered in advance. For example, in the user information 19, as shown in FIG. 4, information corresponding to each user is registered in items such as user name, authentication information, printer driver, panel operation date, consent confirmation processing, and confirmation result. Authentication information is information for identifying the user. For example, when face recognition is performed in the image forming device 3, authentication information is information that records facial features of the user. Printer driver is information in which the type of printer driver installed in the information processing device 4 used by each user is registered, and information related to whether or not the printer driver is an original printer driver provided by the manufacturer of the image forming device 3 is registered. Panel operation date is information that records the date when each user last performed an operation on the operation panel 12. Consent confirmation processing is information that records whether or not consent confirmation processing needs to be performed for the user. If consent confirmation processing needs to be performed, "YES" is recorded, and if not, "NO" is recorded. Further, confirmation result is information that records the result of performing consent confirmation processing for the user. If consent confirmation processing is not yet performed, "unconfirmed" is recorded, if the user consents to the consent confirmation processing, "consent" is recorded, and if not, "dissent" is recorded.

FIG. 5 is a diagram showing an example of the usage data 20. The usage data 20 is a collection of data regarding the usage status of users who have performed the consent operation in consent confirmation processing. As shown in FIG. 5, in the usage data 20, data is recorded for each user. For example, the usage data 20 records device identification information for identifying the image forming device 3, the installation location of the image forming device 3, the date and time of use by the user, the type of job performed on the basis of the user's instruction, information regarding detailed settings of the job, and the like. In such usage data 20, new data is additionally recorded every time a user performs a job using the image forming device 3, for example.

Upon receipt of a print job through the network interface 16, the image forming device 3 described above identifies a job-issuing user who sent the print job. Then, the image forming device 3 determines whether or not the job-issuing user is a target user of consent confirmation processing by referring to the user information 19, and if he/she is a target user of consent confirmation processing, the image forming device 3 pauses printing based on the print job and performs the consent confirmation processing to obtain the consent of the user. That is, even when the user exclusively uses the print function, the image forming device 3 pauses printing based on the print job and performs consent confirmation processing to make such a user perform the consent operation or dissent operation. Hereinafter, such an image forming device 3 will be described in detail.

Figure 6:
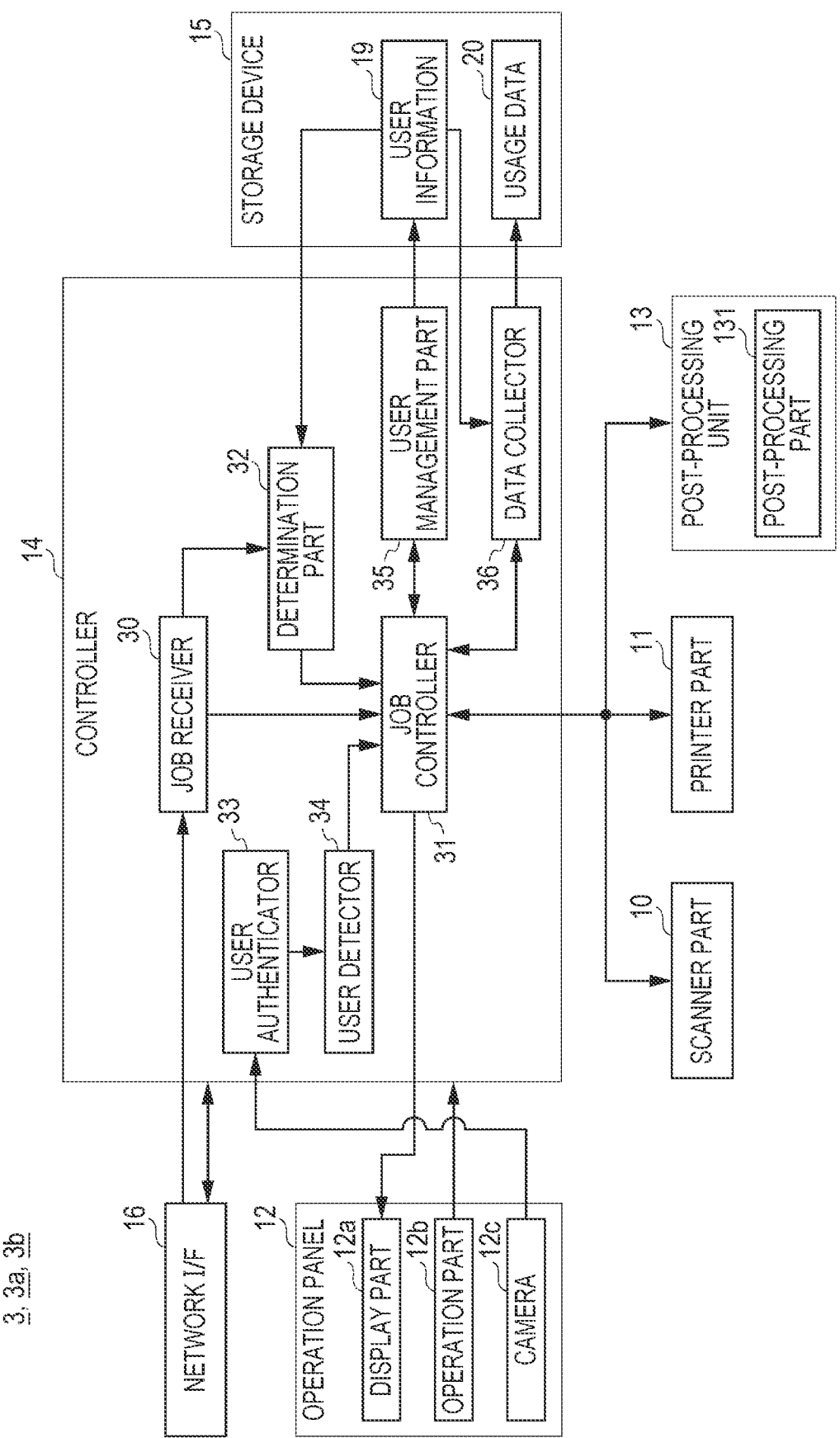
FIG. 6 is a block diagram showing an example of a functional configuration of the image forming device.

FIG. 6 is a block diagram showing an example of a functional configuration of the image forming device 3. By executing the program 18, the CPU 14a of the controller 14 causes the controller 14 to function as a job receiver 30, a job controller 31, a determination part 32, a user authenticator 33, a user detector 34, a user management part 35, and a data collector 36.

The job receiver 30 is a processor that receives a print job addressed to the image forming device 3 through the network interface 16. Upon receipt of the print job, the job receiver 30 activates the job controller 31 and the determination part 32.

The job controller 31 controls execution of a job performed by the image forming device 3. For example, when a print job is accepted by the job receiver 30, the job controller 31 drives the printer part 11 and starts printing based on the received print job. Note, however, that if the job-issuing user who sent the print job is determined by the determination part 32 to be a target user of consent confirmation processing, the job controller 31 performs consent confirmation processing for obtaining the user's consent regarding collection of the usage data 20 in the middle of execution of the print job.

The determination part 32 identifies the job-issuing user who sent the print job, and determines whether or not the job-issuing user is a target user of consent confirmation processing. For example, the determination part 32 refers to header information of the print job and identifies the job-issuing user. Then, the determination part 32 refers to the user information 19 and determines whether or not the job-issuing user is a target user of consent confirmation processing. For example, if the item of consent confirmation processing corresponding to the job-issuing user is "YES" in the user information 19, the determination part 32 determines that the user is a target user of consent confirmation processing. Instead, the determination part 32 may refer to the item of panel operation date corresponding to the job-issuing user in the user information 19, and determine that the job-issuing user is a target user of consent confirmation processing on condition that he/she has not operated the operation panel 12 for a certain period or more, for example.

As a result of the above determination, if the job-issuing user is a target user of consent confirmation processing, the determination part 32 instructs the job controller 31 to suspend the printing based on the print job. Additionally, if the job-issuing user is a target user of consent confirmation processing, the determination part 32 instructs the user detector 34 to detect the job-issuing user. On the other hand, if the job-issuing user is not a target user of consent confirmation processing, the determination part 32 does not give any instruction to the job controller 31 or the user detector 34.

If the determination part 32 determines that the job-issuing user is a target user of consent confirmation processing, the job controller 31 pauses the printing based on the received print job and performs consent confirmation processing to display a consent confirmation screen on the display part 12a of the operation panel 12.

There are several types of consent confirmation screens displayed on the display part 12a by the job controller 31. FIGS. 7A to 7C are diagrams exemplifying the consent confirmation screen. A consent confirmation screen G1 shown in FIG. 7A is, for example, a screen displayed when a new user is registered in the user information 19 and the new user first uses the image forming device 3. On this consent confirmation screen G1, a message requesting consent for collecting the usage data 20 regarding the usage status of the user is displayed. Additionally, since a button B1 to be pressed when the user performs the consent operation and a button B2 to be pressed when the user performs the dissent operation are displayed on the consent confirmation screen G1, the user can perform the consent operation or the dissent operation.

A consent confirmation screen G2 shown in FIG. 7B is, for example, a screen displayed when the collected data items are changed. On this consent confirmation screen G2, a message requesting consent for changing the data items to be collected from now on is displayed. Additionally, since the two buttons B1 and B2 similar to the above are displayed on the consent confirmation screen G2, the user can perform the consent operation or the dissent operation.

A consent confirmation screen G3 shown in FIG. 7C is, for example, a screen displayed when the purpose of use of the usage data 20 is changed. On this consent confirmation screen G3, a message requesting consent for changing the purpose of use of the usage data 20 from now on is displayed. Additionally, since the two buttons B1 and B2 similar to the above are displayed on the consent confirmation screen G3, the user can perform the consent operation or the dissent operation.

For example, the job controller 31 has the above consent confirmation screens G1, G2, and G3 acquired from the server 8 and saved in the storage device 15. When the determination part 32 determines that the user is a target user of consent confirmation processing, the job controller 31 reads an appropriate screen from the consent confirmation screens G1, G2, and G3 from the storage device 15 and displays the screen on the display part 12a.

The timing at which the job controller 31 pauses the printing based on the print job is arbitrary. Hence, the print job may be paused immediately after the execution is started so that the first sheet is not ejected, or may be paused after a predetermined number of sheets are ejected. That is, the job controller 31 pauses the printing in the middle without printing all the number of sheets that should be printed on the basis of the print job.

Then, the job controller 31 displays the consent confirmation screen G1, G2, or G3 on the display part 12*a* with the printing paused. This configuration makes the user who sent the print job surely confirms the content of the consent confirmation screen G1, G2, or G3. Additionally, the job controller 31 cancels the paused state when the user is confirming the consent confirmation screen G1, G2, or G3, and resumes the printing based on the print job.

Note, however, that since the job-issuing user who sent the print job uses his/her own information processing device 4 to send the print job, the job-issuing user moves to the installation location of the image forming device 3 at around the timing when the printing based on the print job ends in the image forming device 3. For example, if the printing speed of the image forming device 3 is 30 sheets per minute and the print job is to be printed on 120 sheets, the user moves to the installation location of the image forming device 3 after about four minutes from transmission of the print job. At this time, if even the first sheet is not printed, the user has to wait for about another four minutes after performing a confirmation operation such as the consent operation or the dissent operation on the consent confirmation screen G1, G2, or G3, which is time consuming.

To prevent this situation, the job controller 31 preferably adjusts the pause timing so that the printing based on the print job can be completed while the user is confirming the content of the consent confirmation screen G1, G2, or G3. For example, if it takes about 20 seconds for the user to confirm the content of the consent confirmation screen G1, G2, or G3, the job controller 31 pauses the printing with less than the predetermined number of sheets that can be output in 20 seconds (e.g., 10 sheets) left to print. As a result, when the user confirms the content of the consent confirmation screen G1, G2, or G3 and performs the confirmation operation, the printing based on the print job is already completed. Hence, wasteful waiting time for the user can be prevented.

Note that if the total number of sheets output by the print job is less than a predetermined number of sheets, the job controller 31 may pause the printing before printing the first sheet.

Next, the user authenticator 33 is a processor that authenticates a user who uses the image forming device 3. The user authenticator 33 drives the camera 12*c* at regular time intervals to capture an image of the front of the image forming device 3 and acquire the captured image. Then, the user authenticator 33 analyzes the captured image to determine whether or not a human face is captured, and if a human face is captured, extracts the facial features and checks them against authentication information of each user registered in the user information 19. As a result, if the facial features shown in the captured image match the authentication information of a specific user, the authentication is successful, and the user authenticator 33 identifies the user who is capable of viewing the display part 12*a* of the operation panel 12. That is, the user authenticator 33 of the present embodiment can automatically authenticate a user when the user approaches the image forming device 3, with no operation performed by the user.

Note, however, that the present invention is not limited to this, and the user authenticator 33 may perform card authentication or biometric authentication on the basis of an authentication operation performed by the user, or may perform authentication on the basis of information (ID, password, or the like) manually input by the user on the operation panel 12, for example.

The user detector 34 functions when the determination part 32 gives an instruction to detect the job-issuing user, and detects that the job-issuing user is capable of viewing the display part 12*a* of the operation panel 12. For example, when the user authenticator 33 performs authentication processing and the user is identified, the user detector 34 determines whether or not the identified user is the job-issuing user. As a result, when the user identified by the user authenticator 33 is the job-issuing user, the user detector 34 detects that the job-issuing user is capable of viewing the display part 12*a* of the operation panel 12. When the user detector 34 detects that the job-issuing user is capable of viewing the display part 12*a* of the operation panel 12, the user detector 34 notifies the job controller 31 to that effect.

Then, the job controller 31 displays the consent confirmation screen G1, G2, or G3 on the display part 12*a* at the timing when the user detector 34 detects that the job-issuing user is capable of viewing the display part 12*a*. As a result, the consent confirmation screen G1, G2, or G3 is not displayed for a user different from the job-issuing user, and the consent confirmation screen G1, G2, or G3 can be surely viewed by the job-issuing user. Additionally, the job controller 31 cancels the paused state of the printing and resumes the printing based on the print job when the consent confirmation screen G1, G2, or G3 is displayed on the display part 12*a*.

Additionally, while the consent confirmation screen G1, G2, or G3 is being displayed, if any of the buttons B1 and B2 is operated by the user, the job controller 31 identifies whether the confirmation operation performed by the user is the consent operation or the dissent operation. Then, the job controller 31 sends the confirmation result D2 to the server 8. Additionally, when the confirmation operation is performed by the user, the job controller 31 activates the user management part 35 to update the user information 19.

The user management part 35 manages the user information 19. When the data items collected as usage data 20 are changed or the purpose of use of the usage data 20 is changed by the server 8, the user management part 35 updates the user information 19 to rewrite the item of consent confirmation processing of all users registered in the user information 19 to "YES", so that consent confirmation processing needs to be performed for all of the users in response to the reception of the change notification D1 from the server 8. Hence, when the data items collected as the usage data 20 are changed or the purpose of use of the usage data 20 is changed by the server 8, all users who use the image forming device 3 are changed to a target user of consent confirmation processing.

Additionally, when the confirmation operation of the target user is accepted in the consent confirmation processing by the job controller 31, the user management part 35 updates the user information 19 on the basis of the confirmation operation. Specifically, the user management part 35 changes a target user to a non-target user by rewriting the item of consent confirmation processing of the target user in the user information 19 to "NO". At this time, if the confirmation operation performed by the target user is the consent operation, the user management part 35 rewrites the item of confirmation result from "unconfirmed" to "consent". Additionally, if the confirmation operation performed by the target user is the dissent operation, the user management part 35 rewrites the item of confirmation result from "unconfirmed" to "dissent".

Additionally, when the user management part 35 registers information regarding a new user who uses the image forming device 3 in the user information 19, the item of consent confirmation processing of the new user is initially set to "YES". As a result, consent confirmation processing is performed when the new user first uses the image forming device 3.

The data collector 36 functions every time a job is performed by the job controller 31, for example. The data collector 36 reads the user information 19 and determines whether or not the job-issuing user of the job performed by the job controller 31 consents to collection of the usage data 20. As a result, if the consent of the job-issuing user has been already obtained, the data collector 36 acquires detailed information of the job performed by the job controller 31 from the job controller 31 and stores and records it in the usage data 20. On the other hand, if the consent of the job-issuing user is not obtained, the data collector 36 does not acquire detailed information of the job and does not update the usage data 20. That is, the data collector 36 collects the usage data 20 regarding the usage status of each user according to the status of the confirmation operation performed by each user who uses the image forming device 3.

Then, the data collector 36 reads the usage data 20 from the storage device 15 at a predetermined timing, and sends the usage data 20 to the server 8.

Figure 8:
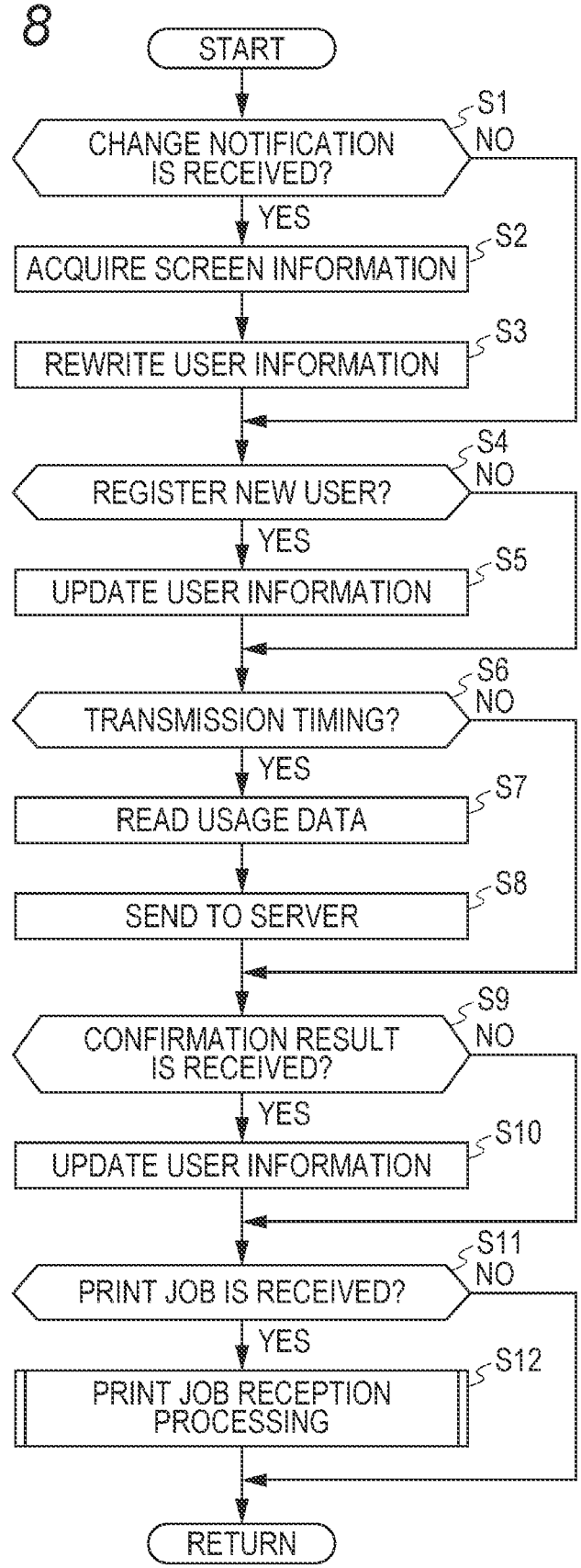
FIG. 8 is a flowchart showing an example of a main processing procedure performed in the image forming device.

Next, the processing procedure performed in the above image forming device 3 will be described. FIG. 8 is a flowchart showing an example of a main processing procedure performed in the image forming device 3. This processing is performed by the CPU 14a of the controller 14 executing the program 18, and is processing that is repeatedly performed in the image forming device 3.

When the image forming device 3 starts the processing procedure shown in FIG. 8, it first determines whether or not the change notification D1 is received from the server 8 (step S1). If the change notification D1 is received (YES in step S1), the image forming device 3 acquires from the server 8 screen information to be displayed on the display part 12a when performing consent confirmation processing (step S2). For example, when the data item collected as the usage data 20 is changed by the server 8, the image forming device 3 acquires screen information for displaying the consent confirmation screen G2 of FIG. 7B. Alternatively, when the purpose of use of the usage data 20 is changed by the server 8, the image forming device 3 acquires screen information for displaying the consent confirmation screen G3 of FIG. 7C. Then, the image forming device 3 rewrites the user information 19 (step S3). At this time, the image forming device 3 rewrites the item of consent confirmation processing of all users registered in the user information 19 to "YES", and rewrites the item of confirmation result thereof to "unconfirmed". Note that if the change notification D1 is not received from the server 8 (NO in step S1), the processing of steps S2 and S3 are skipped.

Next, the image forming device 3 determines whether or not a new user is to be registered (step S4). If a new user is to be registered (YES in step S4), the image forming device 3 additionally registers information regarding the new user in the user information 19 and updates the user information 19 (step S5). At this time, the image forming device 3 records the item of consent confirmation processing of the new user as "YES" and the item of confirmation result thereof as "unconfirmed". Note that if no new user is to be registered (NO in step S4), the processing in step S5 is skipped.

Next, the image forming device 3 determines whether or not the current timing is a transmission timing for sending the usage data 20 to the server 8 (step S6). When it is a transmission timing (YES in step S6), the image forming device 3 reads the usage data 20 from the storage device 15 (step S7) and sends the usage data 20 to the server 8 (step S8). Note that if it is not a transmission timing (NO in step S6), the processing of steps S7 and S8 are skipped.

Next, the image forming device 3 determines whether or not the confirmation result D2 is received from the server 8 (step S9). When the confirmation result D2 is received from the server 8, the image forming device 3 identifies the user who performed the confirmation operation, and updates the information of the identified user recorded in the user information 19 (step S10). That is, the image forming device 3 rewrites the item of consent confirmation processing of the identified user to "NO" and rewrites the item of confirmation result thereof to "consent" or "dissent" on the basis of the confirmation result D2. Note that if the confirmation result D2 is not received from the server 8 (NO in step S9), the processing in step S10 is skipped.

Next, the image forming device 3 determines whether or not a print job is received through the network 7 (step S11). If a print job is received (YES in step S11), the image forming device 3 performs print job reception processing (step S12). On the other hand, if no print job is received (NO in step S11), the processing by the image forming device 3 ends.

Figure 9:
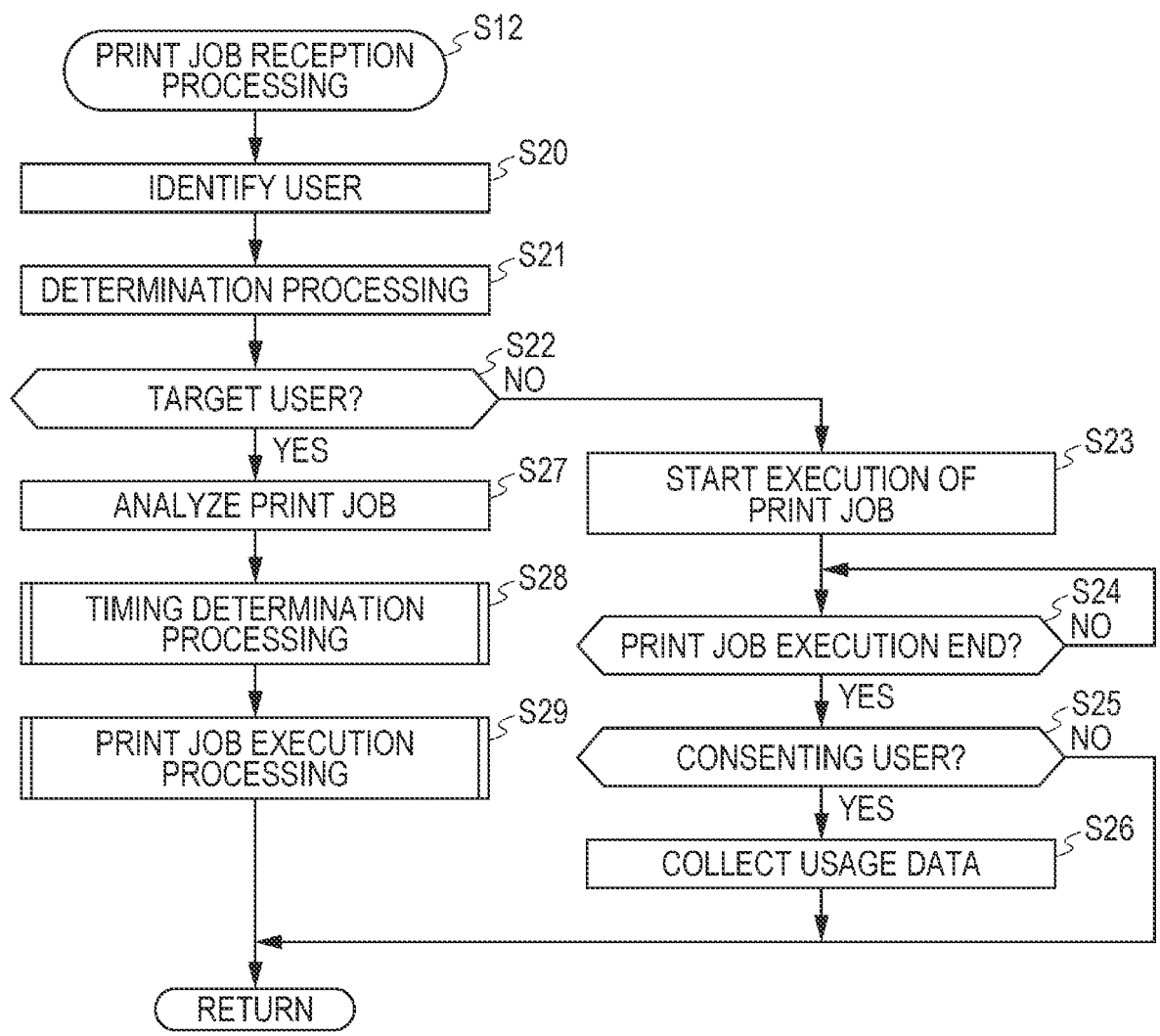
FIG. 9 is a flowchart showing an example of a detailed processing procedure of print job reception processing of a first embodiment.

FIG. 9 is a flowchart showing an example of a detailed processing procedure of the print job reception processing (step S12). When the print job reception processing is started, the image forming device 3 identifies the job-issuing user who sent the print job (step S21), and determines whether or not the job-issuing user is a target user of consent confirmation processing (step S22).

As a result, if the job-issuing user is a non-target user of consent confirmation processing (NO in step S22), the image forming device 3 starts executing the received print job (step S23). As a result, the image forming device 3 starts printing based on the print job. Then, when the execution of the print job ends (YES in step S24), the image forming device 3 refers to the user information 19 and determines whether or not the job-issuing user is a consenting user who has consented to collection of the usage data 20. (Step S25). As a result, if it is a consenting user (YES in step S25), the image forming device 3 collects the usage data 20 based on the print job executed this time and updates the usage data 20 (step S26). Note that if the job-issuing user is a dissenting user who does not consent to collection of the usage data 20 (NO in step S25), the image forming device 3 does not collect the usage data 20.

On the other hand, if the job-issuing user is a target user of consent confirmation processing (YES in step S22), the image forming device 3 analyzes the received print job (step S27). By this analysis, the number of sheets to be printed by the print job is identified. Then, the image forming device 3 performs timing determination processing (step S28). In this timing determination processing, the timing for pausing the printing based on the print job is determined. Then, after performing the timing determination processing, the image forming device 3 performs print job execution processing (step S29).

Figure 10:
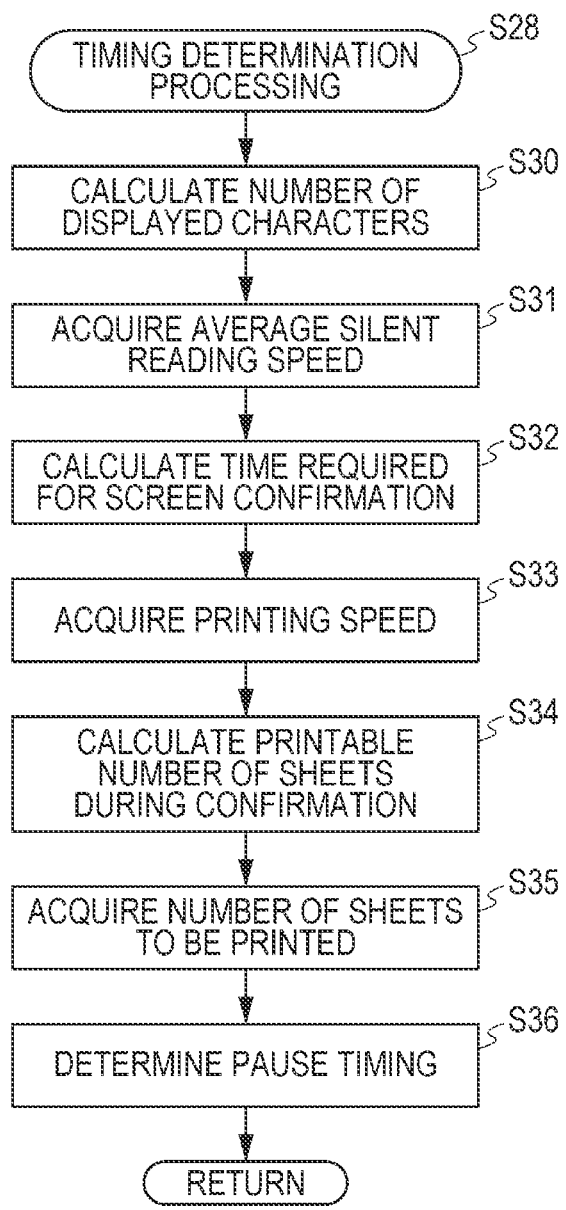
FIG. 10 is a flowchart showing an example of a detailed processing procedure of timing determination processing.

FIG. 10 is a flowchart showing an example of a detailed processing procedure of the timing determination processing (step S28). When the image forming device 3 starts the timing determination processing, it analyzes the consent confirmation screen G1, G2, or G3 displayed on the display part 12a in the consent confirmation processing to calculate the number of displayed characters included in the consent confirmation screen G1, G2, or G3 (step S30). Additionally, the image forming device 3 acquires the average silent reading speed of each user (step S31). For example, the average silent reading speed is stored in advance in the storage device 15 or the like, and the image forming device 3 acquires the average silent reading speed. The average silent reading speed is the average speed at which a user silently reads a character string displayed on the display part 12a, and is expressed as the number of characters that can be read silently per predetermined time (e.g., one minute). Then, the image forming device 3 calculates the time required for screen confirmation; the time required for the user to confirm the content of the consent confirmation screen G1, G2, or G3 (step S32). That is, the image forming device 3 calculates the time required for screen confirmation by dividing the number of displayed characters included in the consent confirmation screen G1, G2, or G3 by the average silent reading speed.

Next, the image forming device 3 confirms performance information of the image forming device 3, and acquires the printing speed of the printer part 11 (step S33). For example, performance information is stored in advance in the storage device 15 or the like, and the image forming device 3 acquires the printing speed on the basis of the performance information. For example, the printing speed is expressed as the number of sheets printable by the printer part 11 per predetermined time (e.g., one minute). Note that when the printing speed differs between color printing and monochrome printing, the image forming device 3 determines whether it is color printing or monochrome printing on the basis of the print settings of the print job, and acquires the printing speed corresponding to the print job on the basis of the determination result.

Then, the image forming device 3 calculates the number of sheets printable by the printer part 11 while the user confirms the consent confirmation screen G1, G2, or G3 (step S34). That is, the image forming device 3 calculates the number of sheets printable during the user's confirmation by dividing the printing speed acquired in step S33 by the time required for screen confirmation calculated in step S32.

Then, the image forming device 3 acquires the number of sheets to be printed identified in step S27 (step S35), and determines the pause timing on the basis of the number of sheets to be printed and the printable number of sheets calculated in step S34 (step S36). That is, the image forming device 3 determines the pause timing by subtracting the number of sheets printable during the user's confirmation from the number of sheets to be printed by the print job. This pause timing is a value that defines the number of sheets to be output before pausing the printing based on the print job. For example, when the number of sheets to be printed by the print job is N and the number of sheets printable during the user's confirmation is M, the value L indicating the pause timing is expressed as L=N−M. As a specific example, assume a case where a user sends a print job for printing on 120 sheets. In this case, if the image forming device 3 can print on and output 10 sheets while the user is confirming the display content of the consent confirmation screen G1, G2, or G3, according to the timing determination processing as described above, the image forming device 3 determines the timing at which printing is performed on 110 sheets as the pause timing. However, when M>N, the printing is paused immediately after the start of execution of the print job, and the paused state starts before the first printing based on the print job is performed. Thus, the timing determination processing (step S28) ends.

Figure 11:
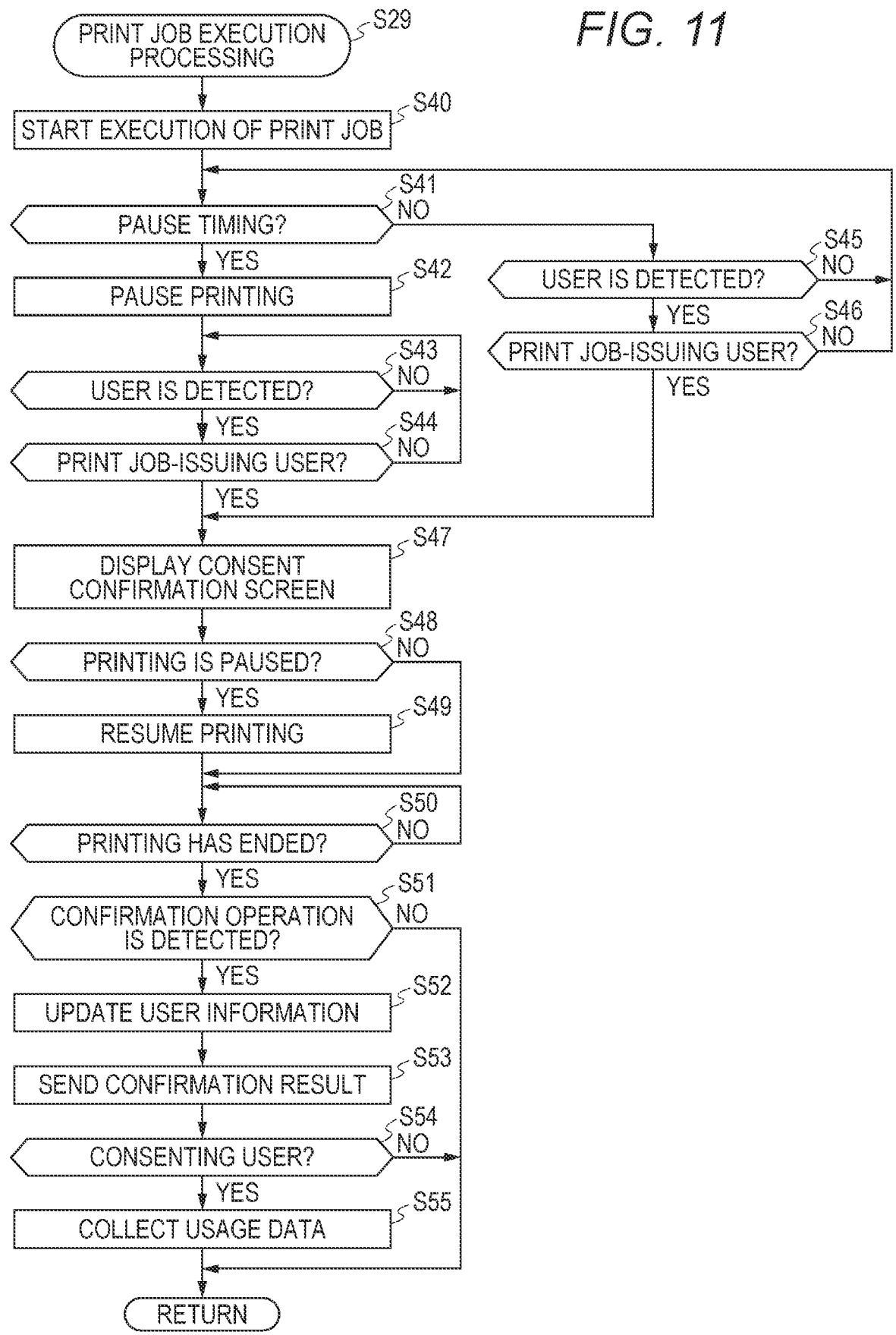
FIG. 11 is a flowchart showing an example of a detailed processing procedure of print job execution processing.

Next, FIG. 11 is a flowchart showing an example of a detailed processing procedure of the print job execution processing (step S29). When the image forming device 3 starts the print job execution processing, it starts performing the print job (step S41). When execution of the print job is started, the image forming device 3 determines whether or not the current timing is the pause timing determined in step S28 (step S41). If it is the pause timing (YES in step S41), the image forming device 3 pauses the printing based on the print job (step S42). For example, when the pause timing is determined as the time when the third sheet is output, the image forming device 3 feeds the third sheet and then pauses the printing without feeding the fourth and subsequent sheets.

When the printing is paused, the image forming device 3 then determines whether or not a user who is attempting to use the image forming device 3 is detected (step S43). For example, the image forming device 3 detects a user when the user is authenticated by the user authenticator 33. Additionally, the image forming device 3 also detects a user when an operation on the operation part 12b of the operation panel 12 is detected. When the image forming device 3 detects a user (YES in step S43), it determines whether or not the user is the job-issuing user (step S44). As a result, if the user who is attempting to use the image forming device 3 is not the job-issuing user who sent the paused print job (NO in step S44), the processing by the image forming device 3 returns to step S43 and goes into stand-by until the job-issuing user is detected. Additionally, if it is determined that the user who is attempting to use the image forming device 3 is the job-issuing user (YES in step S44), the processing by the image forming device 3 proceeds to step S47. That is, the image forming device 3 performs the processing of step S47 and subsequent steps when the job-issuing user is capable of viewing the display part 12a of the operation panel 12.

On the other hand, if it is not the pause timing after starting the printing based on the print job (NO in step S41), as in the processing described above, the image forming device 3 determines whether or not a user who is attempting to use the image forming device 3 is detected (step S45). Then, when the image forming device 3 detects a user (YES in step S45), it determines whether or not the user is the job-issuing user (step S46). As a result, if the user is not the job-issuing user (NO in step S46), the processing returns to step S41. Alternatively, if the user is the job-issuing user (YES in step S46), the processing by the image forming device 3 proceeds to step S47. That is, there are cases where the image forming device 3 proceeds to step S47 without pausing the printing based on the print job. For example, when the job-issuing user sends a print job including a large number of pages of 100 pages or more to the image forming device 3 and immediately moves to the installation location of the image forming device 3, the image forming device 3 will detect the job-issuing user before pausing the printing. In such a case, it is determined as YES in step S46, and the processing proceeds to step S47. Additionally, in this case, the image forming device 3 also performs the processing of step S47 and subsequent steps when the job-issuing user is capable of viewing the display part 12a of the operation panel 12.

Proceeding to step S47, the image forming device 3 performs consent confirmation processing. That is, the image forming device 3 displays the consent confirmation screen G1, G2, or G3 on the display part 12a (step S47). When the consent confirmation screen G1, G2, or G3 is displayed, the image forming device 3 determines whether or not the printing is paused (step S48), and if it is paused (YES in step S48), the paused state is canceled and the printing based on the print job is resumed (step S49). That is, in order to complete printing while the job-issuing user is confirming the content of the consent confirmation screen G1, G2, or G3, the image forming device 3 resumes the printing along with the display of the consent confirmation screen G1, G2, or G3. Note that if the printing is not paused (NO in step S48), the image forming device 3 continues the printing as it is.

Then, the image forming device 3 determines whether or not the printing based on the print job has ended (step S50). When the printing ends (YES in step S50), the image forming device 3 determines whether or not the confirmation operation of the job-issuing user on the consent confirmation screen G1, G2, or G3 is detected (step S51). When the confirmation operation by the job-issuing user is detected (YES in step S51), the image forming device 3 updates the user information 19 on the basis of the content (consent operation or dissent operation) of operation of the job-issuing user (step S52). Then, the image forming device 3 sends the confirmation result D2 by the job-issuing user to the server 8 (step S53). As a result, the server 8 can notify other image forming devices 3 of the confirmation result D2.

Subsequently, the image forming device 3 determines whether or not the job-issuing user is a consenting user who has consented to collection of the usage data 20 (step S54). As a result, if it is a consenting user (YES in step S54), the image forming device 3 collects the usage data 20 based on the print job executed this time and updates the usage data 20 (step S55). Note that if the job-issuing user is a dissenting user who does not consent to collection of the usage data 20 (NO in step S54), the image forming device 3 does not collect the usage data 20.

Note that if the image forming device 3 does not detect the confirmation operation of the job-issuing user from the end of the printing until the elapse of a predetermined time (NO in step S51), the processing of steps S52 to S55 is skipped. Thus, the job execution processing (step S29) ends.

Figure 12A:
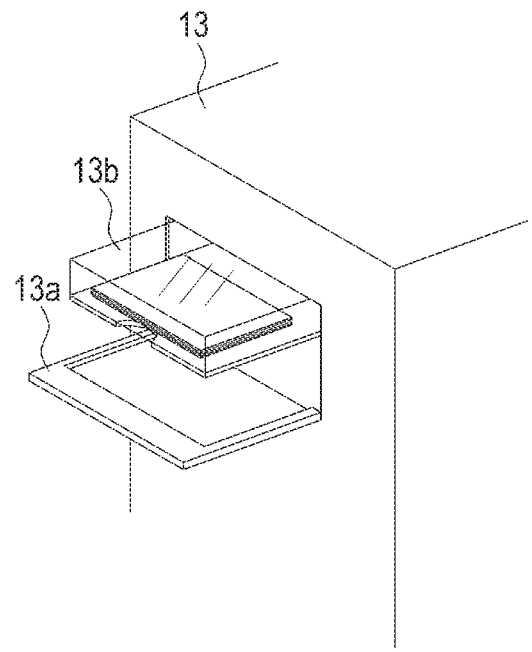
FIGS. 12A and 12B are diagrams exemplifying a state in which printing is paused with sheets held in a temporary stacker.
Figure 12B:
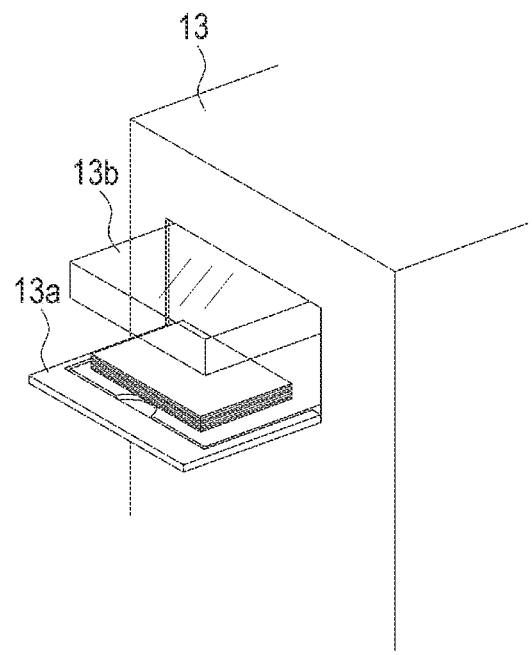

Incidentally, when the post-processing unit 13 is provided with a temporary stacker, the image forming device 3 may pause printing with sheets held in the temporary stacker immediately before they are ejected to the output tray 13a. FIGS. 12A and 12B are diagrams showing a state in which printing is paused with sheets held in a temporary stacker. As shown in FIG. 12A, the post-processing unit 13 includes a temporary stacker 13b that holds sheets immediately before they are ejected to the output tray 13a. For example, the temporary stacker 13b includes a sheet holding plate that can be moved up and down in the vertical direction and holds the sheets, and a transparent cover that protects the periphery of the sheet holding plate. When pausing printing based on a print job, as shown in FIG. 12A, after ejecting the sheets to the temporary stacker 13b, the image forming device 3 does not eject the sheets to the output tray 13a, but pauses the printing with the sheets held in the stacker 13b. Hence, when the job-issuing user moves to the installation location of the image forming device 3 to acquire printed matter, he/she can recognize that the printing is paused because the sheets are not ejected to the output tray 13a. Thus, it is possible to make the job-issuing user view the consent confirmation screen G1, G2, or G3. Additionally, by holding the sheets in the temporary stacker 13b, it is possible to prevent the job-issuing user from taking away the printed matter that has been output up to that point without noticing that the printing has been paused. Then, when the printing is resumed and output of all the sheets is completed, the image forming device 3 lowers the sheet holding plate of the temporary stacker 13b, and as shown in FIG. 12B, ejects the sheets to the output tray 13a as completed printed matter.

As described above, the image forming device 3 of the present embodiment collects the usage data 20 regarding the usage status of the user and sends it to the server 8. When a print job is received through the network 7, the image forming device 3 determines whether or not the user who sent the print job is a target user of consent confirmation processing regarding collection of the usage data 20. If it is determined that the user is a target user of consent confirmation processing, the image forming device 3 pauses the printing based on the print job and also performs the consent confirmation processing to display the consent confirmation screen G1, G2, or G3 on the display part 12a. Hence, the image forming device 3 of the present embodiment can appropriately perform the consent confirmation processing even for the user who uses the print function, and can obtain the user's consent for collecting the usage data 20.

Additionally, when it is detected that the user who sent the print job is capable of viewing the display part 12a, the image forming device 3 of the present embodiment displays the consent confirmation screen G1, G2, or G3 on the display part 12a. Hence, it is possible to prevent display of the consent confirmation screen G1, G2, and G3 when a user different from the user who sent the print job (e.g., non-target user) uses the image forming device 3.

Then, according to the image forming device 3 of the present embodiment, it is possible to collect data regarding the usage status of each user whose consent to collection of the usage data 20 has been obtained. The usage data 20 can be used for later improvement of the device or can be used to provide the optimum service according to the usage status of each customer.

Note that the present embodiment describes an example in which, when the user who sent the print job is capable of viewing the display part 12a of the operation panel 12, the image forming device 3 performs the consent confirmation processing and displays the consent confirmation screen G1, G2, or G3 on the display part 12a. However, if an original printer driver provided by the manufacturer of the image forming device 3 is installed in the information processing device 4 used by the target user of the consent confirmation processing, it is possible to display a screen similar to the consent confirmation screen G1, G2, or G3 described above on the display part of the information processing device 4 by using a function of such a printer driver. Hence, the processing of displaying the consent confirmation screen G1, G2, or G3 on the display part 12a of the operation panel 12 as described above may be performed exclusively when an original printer driver provided by the manufacturer of the image forming device 3 is not installed in the information processing device 4 used by the target user of the consent confirmation processing. For example, in a case where a general-purpose printer driver such as AirPrint, Mopria, or GooglePrint that is not original to the manufacturer is installed in the information processing device 4 used by the user, upon receipt of a print job from such an information processing device 4, the image forming device 3 may pause the printing based on the print job and display the consent confirmation screen G1, G2, or G3 on the display part 12a.

Second Embodiment

Next, a second embodiment of the present invention will be described. When the image forming device 3 pauses the printing based on the print job as described in the above first embodiment, the user may not notice that the printing is paused in the image forming device 3 and send the same print job again from his/her information processing device 4. In this case, if the printing based on the first print job is performed, the printing based on the second print job is often unnecessary. Thus, automatic printing sometimes leads to a waste of printed matter. Against this background, in the present embodiment, an image forming device 3 capable of eliminating such waste will be described.

Additionally, the image forming device 3 may also receive a print job sent by another user while the printing is paused. In this case, if the print job of another user is performed after the execution of the paused print job is completed, the timing at which the printed matter can be obtained by the other user is delayed, and convenience is reduced. Against this background, in the present embodiment, an image forming device 3 capable of preventing such a decrease in convenience will also be described.

The basic configuration and operation of an image forming system 1 and an image forming device 3 of the present embodiment are similar to those described in the first embodiment. Hence, the operation peculiar to the image forming device 3 of the present embodiment will be described below.

Figure 13:
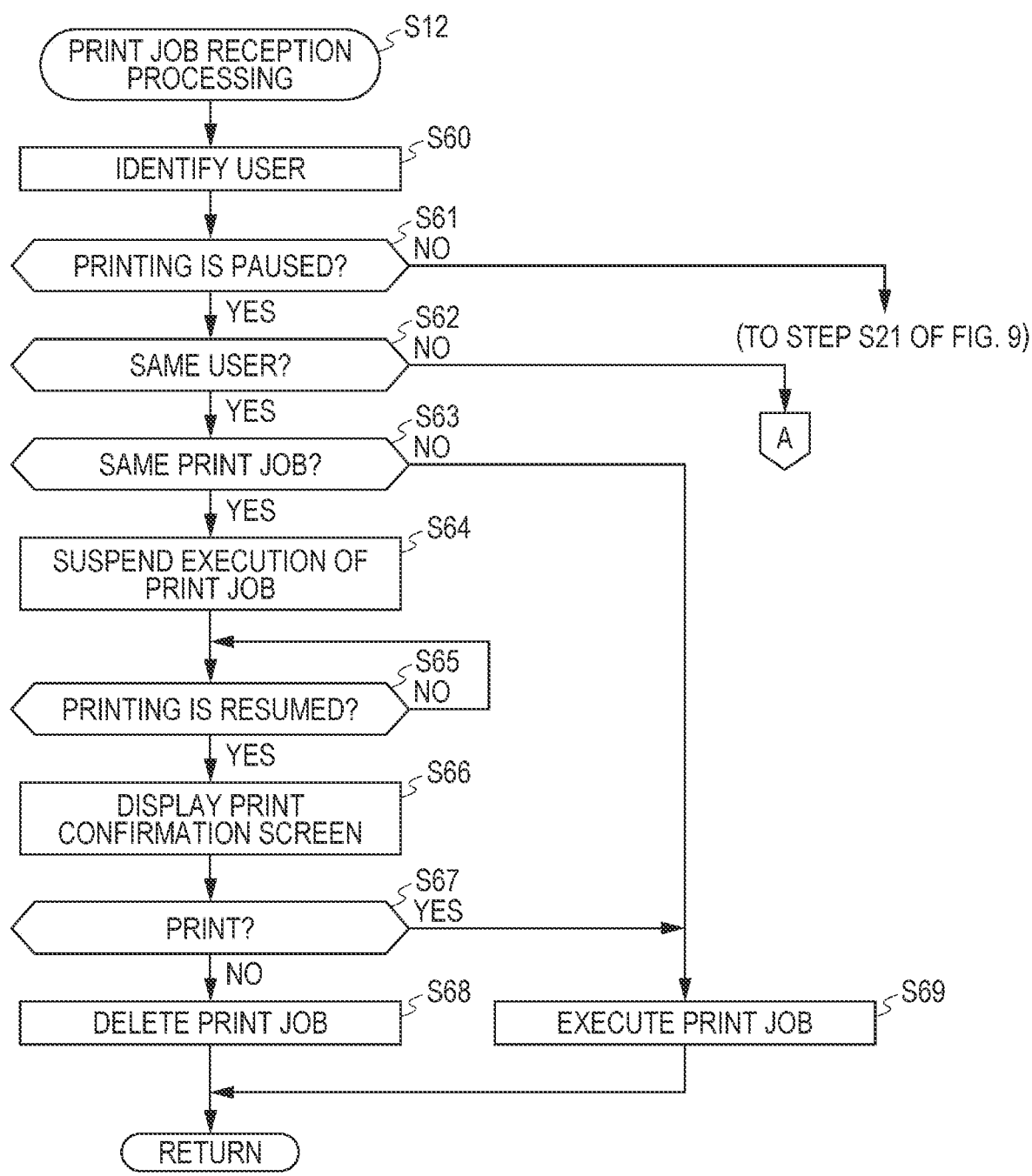
FIG. 13 is a flowchart showing an example of a detailed processing procedure of print job reception processing of a second embodiment.

FIG. 13 is a flowchart showing an example of a detailed processing procedure of print job reception processing (step S12 of FIG. 8) of the second embodiment. When the image forming device 3 starts the print job reception processing, it identifies the job-issuing user who sent the print job (step S60). Then, the image forming device 3 determines whether or not the printing is being paused (step S61). If the printing is not paused (NO in step S61), the processing by the image forming device 3 proceeds to step S21 of FIG. 9. In this case, the image forming device 3 performs processing similar to that described in the first embodiment.

On the other hand, if the printing is paused (YES in step S61), the image forming device 3 determines whether or not the job-issuing user of the print job received this time is the same as the job-issuing user of the paused print job (step S62). As a result, if they are the same user (YES in step S62), the image forming device 3 determines whether or not the paused print job and the print job received this time are the same print job (step S63). If the paused print job and the print job received this time are the same print job (YES in step S63), the image forming device 3 suspends execution of the print job received this time (step S64). That is, since the printing based on the print job received this time may be wasted, the image forming device 3 saves the print job received this time in a storage device 15 or the like and suspends execution thereof.

Thereafter, the image forming device 3 stands by until printing of the paused print job is resumed (NO in step S65), and when the printing is resumed (YES in step S65), displays the print confirmation screen on a display part 12a (step S66). Note that the timing at which the printing is resumed is similar to the timing described in the first embodiment.

FIG. 14 is a diagram showing an example of a print confirmation screen G4. When the paused printing is resumed, the image forming device 3 displays the print confirmation screen G4 as shown in FIG. 14 on the display part 12a. This print confirmation screen G4 is a screen that inquires of the user about reception of the same print job as the print job whose printing has been resumed, and whether or not to perform the same print job after the resumed print job. Additionally, the print confirmation screen G4 displays a button B1 to be pressed when the user desires to consecutively perform the same print job, and a button B2 to be pressed when the user does not instruct execution of the same print job. Hence, by performing an operation on the print confirmation screen G4, the user can perform printing based on the same print job or cancel execution of the same print job.

Incidentally, when the printing that was paused in the image forming device 3 is resumed, the above-mentioned consent confirmation screen G1, G2, or G3 is displayed on the display part 12a. Hence, the image forming device 3 may display the print confirmation screen G4 shown in FIG. 14 after the user performs the confirmation operation on the consent confirmation screen G1, G2, or G3. Additionally, the image forming device 3 may divide the display area of the display part 12a into two and display the consent confirmation screen G1, G2, or G3 and the print confirmation screen G4 simultaneously.

Returning to the flowchart of FIG. 13, when the print confirmation screen G4 is displayed, the image forming device 3 accepts an operation by the user and determines whether or not to perform printing based on the same print job (step S67). If the user instructs to execute the same print job (YES in step S67), the image forming device 3 reads the print job saved in the storage device 15 and performs the printing based on the print job (step S69). In this case, the same printed matter will be output again according to the user's intention.

On the other hand, if the user does not instruct to execute the same print job (NO in step S67), the image forming device 3 cancels the same print job and deletes the print job saved in the storage device 15. (Step S68). Accordingly, when the previous print job is paused, even when the user sends the same print job again without noticing it, the image forming device 3 is allowed to confirm whether or not to reprint the same print job when the user is capable of viewing the display part 12a. Hence, no wasteful printed matter is generated.

Figure 15:
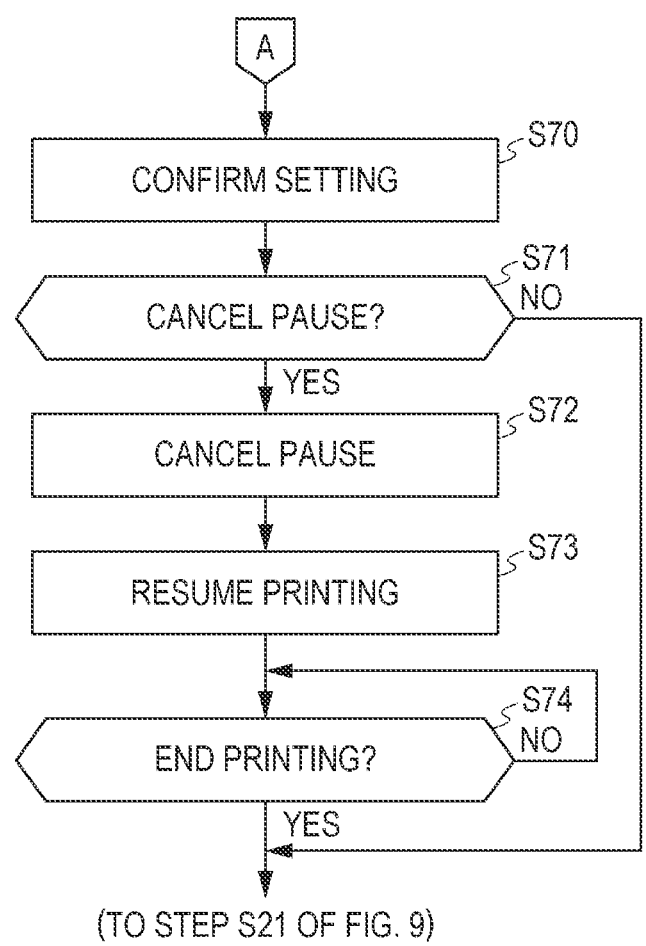
FIG. 15 is a flowchart showing an example of a processing procedure performed by an image forming device of the second embodiment.

On the other hand, if another user sends a print job while the printing is paused (NO in step S62), the processing by the image forming device 3 proceeds to the flowchart of FIG. 15. The image forming device 3 is in a set state preset by an administrator or the like, and confirms the operation setting when a print job of another user is received while printing is paused (step S70). This operation setting is a setting selected from any one of (1) canceling the printing paused state to resume the printing and executing the print job of the other user after the printing ends, and (2) continuing the printing paused state and preferentially executing the print job of the other user. The image forming device 3 determines whether or not to cancel the paused state on the basis of the operation setting (step S71). When canceling the paused state (YES in step S71), the image forming device 3 cancels the pause of the printing (step S72) and resumes the printing (step S73). At this time, since the job-issuing user is not capable of viewing the display part 12a, the consent confirmation screen G1, G2, or G3 is not displayed. Then, when the printing ends (YES in step S74), the processing by the image forming device 3 proceeds to step S21 of FIG. 9. That is, processing similar to that described in the first embodiment is performed on the print job sent by the other user.

On the other hand, when the paused state is not canceled (NO in step S71), the image forming device 3 performs the processing of step S21 and subsequent steps of FIG. 9 while maintaining the paused state of the printing. Accordingly, the print job of the other user received afterwards is performed with a higher priority than the paused print job.

As described above, in a paused state of a print job, when a user other than the user who sent the print job is to use the image forming device 3 of the present embodiment, the paused state of the print job can be canceled and the printing based on the print job can be resumed. In this case, the other user can use the image forming device 3 after the printing based on the paused print job ends.

Alternatively, in a paused state of a print job, when a user other than the user who sent the print job is to use the image forming device 3, the paused state of the print job can be continued. In this case, the other user can use the image forming device 3 while the pause is continued, and can perform his/her own job on the image forming device 3 by interrupting the paused print job.

Note that the points other than those described above in the present embodiment are similar to those described in the first embodiment.

Third Embodiment

Next, a third embodiment of the present invention will be described. In the above second embodiment, the case has been described where the job-issuing user sends the same print job to the same image forming device 3 again without noticing that the printing is paused in the image forming device 3. However, if the job-issuing user misunderstands that the image forming device 3 is out of order, he/she may send the same print job as the paused print job to another image forming device 3. Against this background, in the present embodiment, an image forming device 3 capable of preventing generation of wasteful printed matter even when the job-issuing user sends the same print job to another image forming device 3 will be described. Note that in the following, a case is exemplified in which a user first sends a print job to an image forming device 3a, and the user sends the same print job to another image forming device 3b while the image forming device 3a is pausing the printing.

Figure 16:
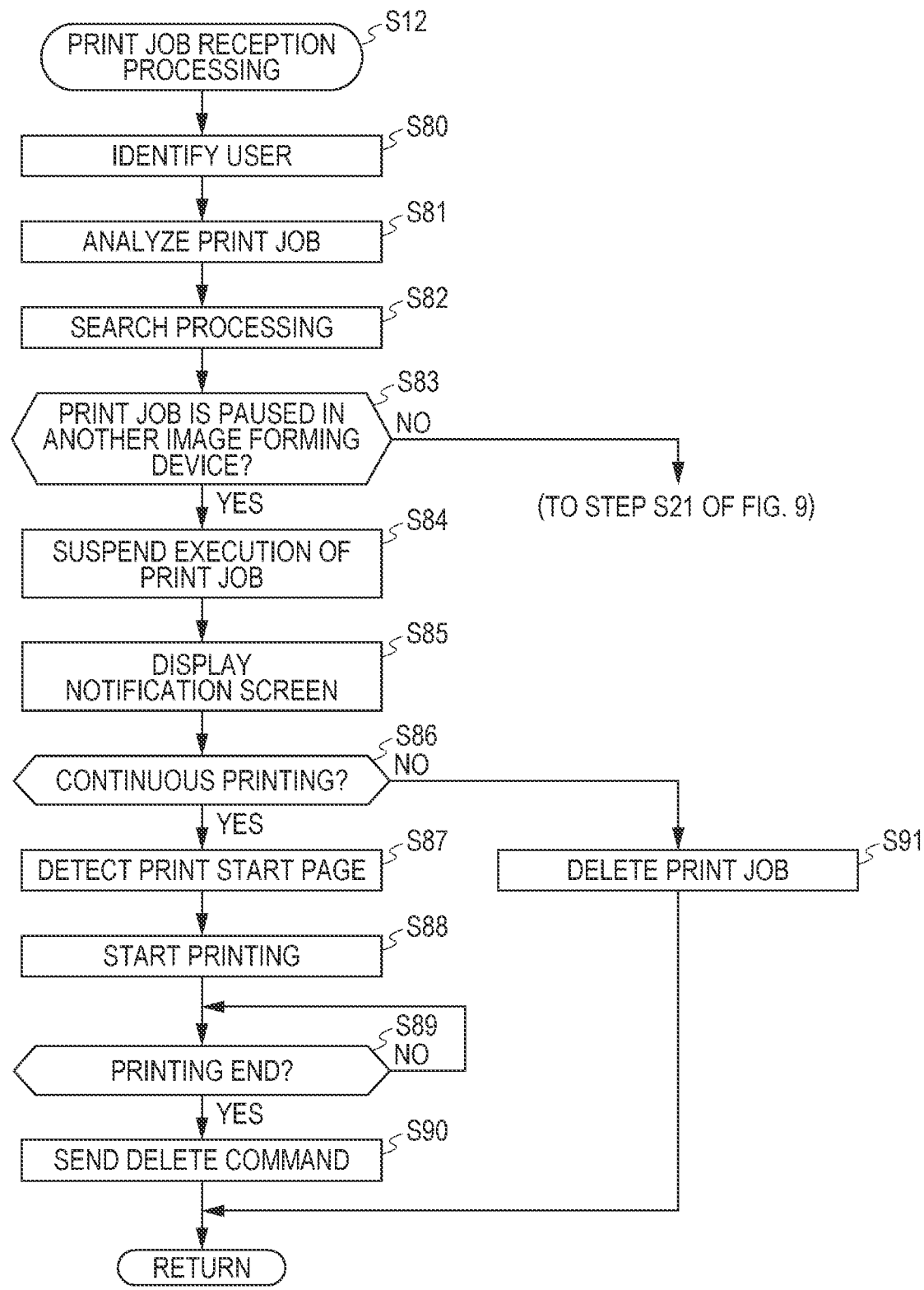
FIG. 16 is a flowchart showing an example of a detailed processing procedure of print job reception processing of a third embodiment.

FIG. 16 is a flowchart showing an example of a detailed processing procedure of print job reception processing (step S12 of FIG. 8) performed by the image forming device 3b in the third embodiment. When the image forming device 3b starts the print job reception processing, it identifies the job-issuing user who sent the print job (step S80) and analyzes the print job (step S81). In the analysis of the print job, processing for identifying the print data to be printed is performed. For example, when the print job includes an electronic file to be printed, the image forming device 3b identifies the file name of the electronic file.

Then, the image forming device 3b performs search processing through a network 7 to determine whether or not there is another image forming device 3a that has received the same print job and is pausing the print job (step S82). For example, the image forming device 3b generates a search command including information that can identify the job-issuing user and the print data, and sends the search command to another image forming device 3a through the network 7. When the other image forming device 3a receives the search command, it determines whether or not it is pausing the same print job sent by the same job-issuing user, and returns the determination result to the image forming device 3b. Accordingly, when the image forming device 3b receives a reply from the other image forming device 3a, the image forming device 3b can determine whether or not printing based on the same print job is paused in the other image forming device 3a (step S83).

As a result of the search processing, if it is determined that the same print job is not paused in the other image forming device 3a (NO in step S83), the processing by the image forming device 3b proceeds to step S21 of FIG. 9, and processing similar to that described in the first embodiment is performed.

On the other hand, as a result of the search processing, if it is determined that the same print job is paused in the other image forming device 3a (YES in step S83), the image forming device 3b suspends execution of the received print job (Step S84). Then, the image forming device 3b generates a notification screen for the job-issuing user, and displays the notification screen on a display part 12a. Note that as in the first embodiment, the image forming device 3b may display the notification screen on the display part 12a when it detects that the job-issuing user is capable of viewing the display part 12a.

FIG. 17 is a diagram showing an example of a notification screen G5. This notification screen G5 includes a message indicating that the same print job has already been received by another image forming device 3a and the printing is paused, and a message that inquires of the user whether or not to perform printing from the page following the printing by the other image forming device 3a. Hence, by viewing the notification screen G5, the user can know that the print job that he/she has previously sent to the other image forming device 3a is paused. Additionally, the notification screen G5 displays a button B1 to be pressed when the user desires to print from the next page, and a button B2 to be pressed when the user does not desire to execute the print job. Hence, by performing an operation on the notification screen G5, the user can perform printing from the continuation of the paused print job or cancel execution of the print job on the image forming device 3b.

Note that while FIG. 17 shows an example of a screen in which the image forming device 3b performs printing from the page following the paused print job, the present invention is not limited to this. For example, the notification screen G5 may include a button for resuming printing by the other image forming device 3a.

Returning to the flowchart of FIG. 17, when the notification screen G5 is displayed, the image forming device 3 accepts an operation by the user and determines whether or not continuous printing for printing from the continuation of the paused print job is selected. (step S86). If the user selects continuous printing (YES in step S86), the image forming device 3b detects the print start page when printing based on the received print job (step S87). At this time, the image forming device 3b may communicate with the other image forming device 3a, detect the paused page in the other image forming device 3a, and detect the print start page based on the page.

Then, the image forming device 3a starts printing from the detected print start page (step S88). Thereafter, the image forming device 3b stands by until the printing ends (step S89), and when the printing ends normally (YES in step S89), sends a delete command for the paused print job to the other image forming device 3a (step S90). When receiving the delete command from the image forming device 3b, the other image forming device 3a cancels the paused state of the printing and deletes the paused print job. As a result, it is possible to prevent the same printed matter from being wastefully output by the two image forming devices 3a, 3b.

Additionally, if the user does not select continuous printing (NO in step S86), the image forming device 3b deletes the received print job (step S91).

As described above, when the image forming device 3b of the present embodiment receives the same print job as the print job whose printing is paused in another image forming device 3a, the image forming device 3b can inform the user that printing is paused in the other image forming device 3a. Hence, it is possible to prevent duplicate printing based on the same print job in the two image forming devices 3a, 3b, and it is possible to eliminate waste of printed matter.

Additionally, the image forming device 3b of the present embodiment may delete the suspended print job when the pause is canceled and printing is resumed in the other image forming device 3a.

Note that the points other than those described above in the present embodiment are similar to those described in the first embodiment or the second embodiment.

MODIFICATION

The embodiments related to the present invention have been described above. However, the present invention is not limited to the contents described in each of the above embodiments, and various modifications can be applied.

For example, the above embodiments exemplify cases where, the image forming device 3 is formed by an MFP and has multiple functions of a copy function and a print function. However, the image forming device 3 is not necessarily limited to having multiple functions. For example, the image forming device 3 may be a printer having only a printing function.

Additionally, the above embodiments exemplify cases where the program 18 executed in the image forming device 3 is installed in advance in the image forming device 3. However, the present invention is not limited to this, and the program 18 may be installed in the image forming device 3 at an arbitrary timing. In this case, the program 18 is provided in a form that can be downloaded to the image forming device 3 through the network 7, for example. Additionally, the program 18 may be provided by being recorded on a computer-readable recording medium such as a CD-ROM, a DVD-ROM, or a USB memory.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming device that collects usage data regarding a history of operation usage of the image forming device by a user and sends the usage data to a server, the image forming device comprising:
   a first hardware processor that receives a print job;
   a printer that performs printing based on the print job;
   a second hardware processor that determines whether or not a user who sent the print job is a from whom consent regarding collection of the usage data concerning the history of operation has not yet been requested;
   a display that displays various display screens; and
   a third hardware processor that pauses printing based on the print job and performs the consent confirmation processing to cause the display to display a consent confirmation screen, when the second hardware processor determines that the consent regarding collection of the usage data concerning the history of operation has not yet been requested from the user.

2. The image forming device according to claim 1, further comprising
   a fourth hardware processor that detects that the user who sent the print job is capable of viewing the display, wherein
   when the fourth hardware processor detects that the user who sent the print job is capable of viewing the display, the third hardware processor causes the display to display the consent confirmation screen.

3. The image forming device according to claim 2, further comprising
   a fifth hardware processor that authenticates a user who is attempting to use the image forming device, wherein
   when the user who sent the print job is authenticated by the fifth hardware processor, the fourth hardware processor detects that the user who sent the print job is capable of viewing the display.

4. The image forming device according to claim 1, further comprising
   a sixth hardware processor that collects the usage data and sends the usage data to the server, and
   an operation part that accepts an operation on the consent confirmation screen, wherein
   when the user who sent the print job performs a consent operation on the consent confirmation screen, the sixth hardware processor collects the usage data regarding the user.

5. The image forming device according to claim 4, further comprising
   a seventh hardware processor that manages user information in which whether or not a user is a target user of the consent confirmation processing is registered for each user, wherein
   the second hardware processor determines, on the basis of the user information, whether or not the user who sent the print job is a target user of consent confirmation processing regarding collection of the usage data, and
   when the user who sent the print job performs a consent operation or a dissent operation on the consent confirmation screen, the seventh hardware processor rewrites information of the user in the user information from a target user to non-target user.

6. The image forming device according to claim 5, wherein
   when the seventh hardware processor receives a confirmation result from the server that a specific user has performed a consent operation or a dissent operation, the hardware processor rewrites information of the specific user in the user information from a target user to a non-target user.

7. The image forming device according to claim 5, wherein
   when data items collected by the sixth hardware processor are changed or the purpose of use of the usage data is changed, the seventh hardware processor rewrites information of all users registered in the user information to a target user.

8. The image forming device according to claim 1, wherein
   when an information processing device used by the user who sent the print job is capable of displaying the consent confirmation screen, the second hardware processor does not determine that the user is a target user of the consent confirmation processing.

9. The image forming device according to claim 1, wherein
when the second hardware processor determines that the user is a target user of the consent confirmation processing, the third hardware processor determines a pause timing of printing on the basis of the print job, and pauses the printing based on the print job at the pause timing.

10. The image forming device according to claim 9, wherein
the third hardware processor calculates a confirmation time required for the user to confirm the consent confirmation screen, and determines the pause timing on the basis of a print speed of the printer, the number of sheets to be printed by the print job, and the required confirmation time.

11. The image forming device according to claim 9, wherein
after stopping the printing based on the print job at the pause timing, when displaying the consent confirmation screen on the display, the third hardware processor cancels the paused state of the print job and resumes the printing based on the print job.

12. The image forming device according to claim 1, wherein
in the paused state of the print job, when a user other than the user who sent the print job is to use the image forming device, the third hardware processor cancels the paused state of the print job and resumes the printing based on the print job.

13. The image forming device according to claim 1, wherein
in the paused state of the print job, when a user other than the user who sent the print job is to use the image forming device, the third hardware processor continues the paused state of the print job.

14. The image forming device according to claim 1, wherein
in the paused state of the print job, when the first hardware processor receives the same print job again, the third hardware processor suspends printing based on the same print job and causes the display to display a print confirmation screen for confirming to the user whether or not to perform printing based on the same print job.

15. The image forming device according to claim 1, wherein
when the first hardware processor receives the print job, the hardware processor searches for whether or not there is another image forming device that has received the same print job and is pausing the print job, and in a case where the other image forming device is present, the third hardware processor suspends printing based on the print job and causes the display to display a notification screen for notifying that the same print job is paused in the other image forming device.

16. The image forming device according to claim 15, wherein
when the user who sent the print job gives a continuous print instruction on the notification screen, the third hardware processor starts printing based on the print job from the continuation of the paused state in the other image forming device, and sends a deletion command for the paused print job to the other image forming device.

17. A consent confirmation method of performing consent confirmation processing for a user about collection of usage data regarding a history of operation usage of an image forming device by the user in the image forming device that collects the usage data concerning the history of operation and sends the usage data concerning the history of operation to a server, the method comprising:
receiving a print job;
performing printing based on the print job;
determining whether or not a user who sent the print job is a user from whom consent regarding collection of the usage data has not yet been requested; and
pausing printing based on the print job and performing the consent confirmation processing to cause a predetermined display to display a consent confirmation screen, when it is determined in the determining that the consent regarding collection of the usage data has not yet been requested from the user.

18. A non-transitory recording medium storing a computer readable program for causing an image forming device that collects usage data regarding a history of operation usage of the image forming device by a user and sends the usage data to a server to execute:
receiving a print job;
performing printing based on the print job;
determining whether or not a user who sent the print job is a user from whom consent regarding collection of the usage data has not yet been requested; and
pausing printing based on the print job and performing the consent confirmation processing to cause a predetermined display to display a consent confirmation screen, when it is determined in the determining that the consent regarding collection of the usage data has not yet been requested from the user.

* * * * *